United States Patent
Hwang et al.

(10) Patent No.: US 10,110,022 B2
(45) Date of Patent: Oct. 23, 2018

(54) BATTERY CHARGING APPARATUS AND METHOD

(71) Applicant: Automotive Research & Testing Center, Changhua County (TW)

(72) Inventors: Bo-Han Hwang, Changhua County (TW); Deng-He Lin, Changhua County (TW); Chung-Che Huang, Changhua County (TW)

(73) Assignee: Automotive Research & Testing Center, Lugong, Changhua County (TW)

( * ) Notice: Subject to any disclaimer, the term of this patent is extended or adjusted under 35 U.S.C. 154(b) by 201 days.

(21) Appl. No.: 14/956,637

(22) Filed: Dec. 2, 2015

(65) Prior Publication Data

US 2017/0163050 A1 Jun. 8, 2017

(51) Int. Cl.
*H02J 7/00* (2006.01)

(52) U.S. Cl.
CPC .......... *H02J 7/0021* (2013.01); *H02J 7/0004* (2013.01); *H02J 7/0016* (2013.01)

(58) Field of Classification Search
USPC .................................. 320/116–123
See application file for complete search history.

(56) References Cited

U.S. PATENT DOCUMENTS

| | | | |
|---|---|---|---|
| 2011/0298626 A1* | 12/2011 | Fechalos | H01M 10/482 340/664 |
| 2012/0274281 A1* | 11/2012 | Kim | G01R 31/3679 320/112 |
| 2014/0266068 A1 | 9/2014 | O'Brien et al. | |
| 2014/0375275 A1* | 12/2014 | Hung | B60L 3/003 320/139 |

\* cited by examiner

*Primary Examiner* — Binh Tat
(74) *Attorney, Agent, or Firm* — Trop Pruner & Hu, P.C.

(57) ABSTRACT

A battery charging apparatus includes a charging module and a control module. The control module obtains a DIR (dynamic internal resistance) of a battery cell group based on a voltage and a current of the battery cell group, and generates a control signal based on the voltage and the DIR of the battery cell group. The charging module alternates between outputting and not outputting a charge current/voltage to charge the battery cell group based on the control signal.

8 Claims, 4 Drawing Sheets

BATTERY CHARGING APPARATUS AND METHOD

FIELD

This disclosure relates to battery charging, and more particularly to a battery charging apparatus and a battery charging method.

BACKGROUND

U.S. Patent Application Publication No. 2014/0266068 A1 discloses a conventional battery charging apparatus for charging a lithium ion battery cell. When a voltage of the battery cell is smaller than its rated voltage value, the conventional battery charging apparatus alternates at a constant frequency and with a constant duty cycle between outputting and not outputting a charge current with a constant magnitude to charge the battery cell. Otherwise, the conventional battery charging apparatus alternates at the constant frequency and with the constant duty cycle between outputting and not outputting a charge voltage of the rated voltage value (i.e., with a constant magnitude) to charge the battery cell. The conventional battery charging apparatus causes the battery cell to degrade relatively quickly and thus have a relatively short lifetime.

SUMMARY

Therefore, an object of this disclosure is to provide a battery charging apparatus and a battery charging method that can alleviate the drawback of the prior art.

According to one aspect of this disclosure, a battery charging apparatus is configured to charge a battery apparatus that includes a battery cell group and a battery management system. The battery management system is coupled to the battery cell group, measures a voltage and a current of the battery cell group, and generates a sense signal that indicates the voltage and the current of the battery cell group. The battery charging apparatus includes a charging module and a control module. The charging module is used to be coupled to the battery cell group. The control module is coupled to the charging module, is used to be coupled to the battery management system for receiving the sense signal therefrom, and is configured to obtain a DIR (dynamic internal resistance) of the battery cell group based on the voltage and the current of the battery cell group as indicated by the sense signal, to generate a control signal based on the voltage of the battery cell group as indicated by the sense signal and the DIR of the battery cell group, and to output the control signal to the charging module such that the charging module operates based on the control signal. During a current charging time period where the control module determines that the voltage of the battery cell group is smaller than a predetermined voltage limit value, the control module generates, based on the DIR of the battery cell group, the control signal making the charging module alternate between outputting and not outputting a charge current to charge the battery cell group, and at least one of an output time length in respect of the charge current, a non-output time length in respect of the charge current and a magnitude of the charge current is associated with the DIR of the battery cell group. During a voltage charging time period where the control module determines that the voltage of the battery cell group is not smaller than the predetermined voltage limit value, the control module generates, based on the DIR of the battery cell group, the control signal making the charging module alternate between outputting and not outputting a charge voltage to charge the battery cell group, and at least one of an output time length in respect of the charge voltage and a non-output time length in respect of the charge voltage is associated with the DIR of the battery cell group.

According to another aspect of this disclosure, there is provided a battery charging method for charging a battery apparatus. The battery apparatus includes a battery cell group and a battery management system. The battery management system is coupled to the battery cell group, measures a voltage and a current of the battery cell group, and generates a sense signal that indicates the voltage and the current of the battery cell group. The battery charging method is to be performed by a battery charging apparatus that is coupled to the battery cell group and the battery management system, that receives the sense signal from the battery management system, and that obtains a DIR of the battery cell group based on the voltage and the current of the battery cell group as indicated by the sense signal. The battery charging method includes the steps of: (A) determining whether the voltage of the battery cell group as indicated by the sense signal is smaller than a predetermined voltage limit value; (B) when it is determined in step (A) that the voltage of the battery cell group is smaller than the predetermined voltage limit value, alternating, with reference to the DIR of the battery cell group, between outputting and not outputting a charge current to charge the battery cell group, where at least one of an output time length in respect of the charge current, a non-output time length in respect of the charge current and a magnitude of the charge current is associated with the DIR of the battery cell group; and (C) when it is determined in step (A) that the voltage of the battery cell group is not smaller than the predetermined voltage limit value, alternating, with reference to the DIR of the battery cell group, between outputting and not outputting a charge voltage to charge the battery cell group, where at least one of an output time length in respect of the charge voltage and a non-output time length in respect of the charge voltage is associated with the DIR of the battery cell group.

BRIEF DESCRIPTION OF THE DRAWINGS

Other features and advantages of this disclosure will become apparent in the following detailed description of the embodiment with reference to the accompanying drawings, of which.

DETAILED DESCRIPTION

Figure 1:
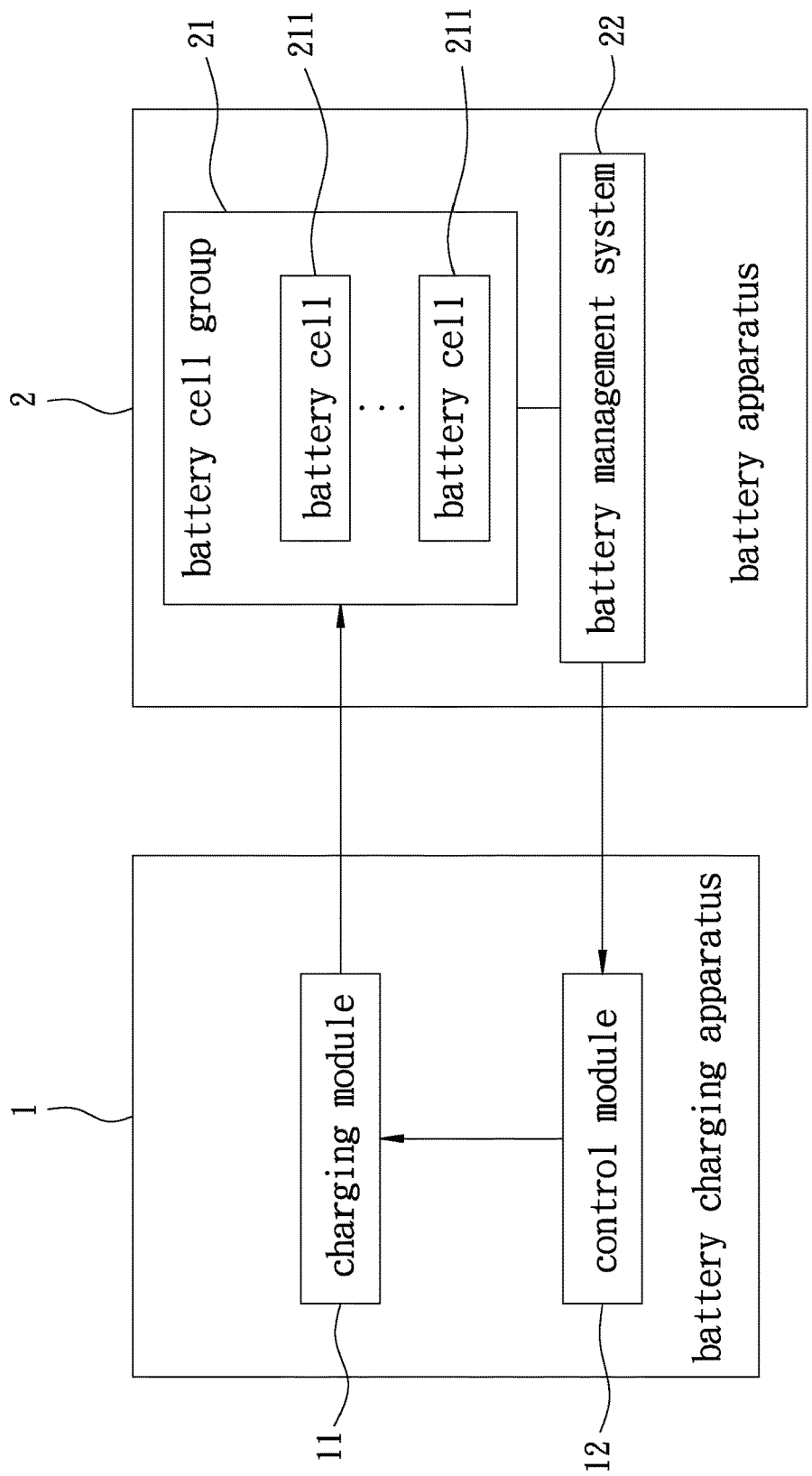
FIG. 1 is a block diagram illustrating an embodiment of a battery charging apparatus in use with a battery apparatus according to this disclosure.

Referring to FIG. 1, an embodiment of a battery charging apparatus 1 according to this disclosure is used to charge a battery apparatus 2. The battery apparatus 2 (e.g., a battery module or a battery pack) includes a battery cell group 21 and a battery management system 22. The battery cell group 21 includes a plurality of battery cells 211 coupled in series, in parallel or in any combination of series and parallel. The battery management system 22 is coupled to the battery cell group 21, periodically (e.g., every second) or continuously measures a voltage, a current, a temperature and an SOC (state of charge) of the battery cell group 21, and generates a sense signal indicating the measured parameters.

The battery charging apparatus 1 of this embodiment includes a charging module 11 and a control module 12. The charging module 11 is used to be coupled to the battery cell group 21. The control module 12 is coupled to the charging module 11, and is used to be further coupled to the battery management system 22 for receiving the sense signal therefrom. The control module 12 is configured to obtain a DIR (dynamic internal resistance) of the battery cell group 21 based on the voltage, the current and the temperature of the battery cell group 21 as indicated by the sense signal, to generate a control signal based on the voltage and the SOC of the battery cell group 21 as indicated by the sense signal and on the DIR of the battery cell group 21, and to output the control signal to the charging module 11 such that the charging module 11 operates based on the control signal.

Figure 2:
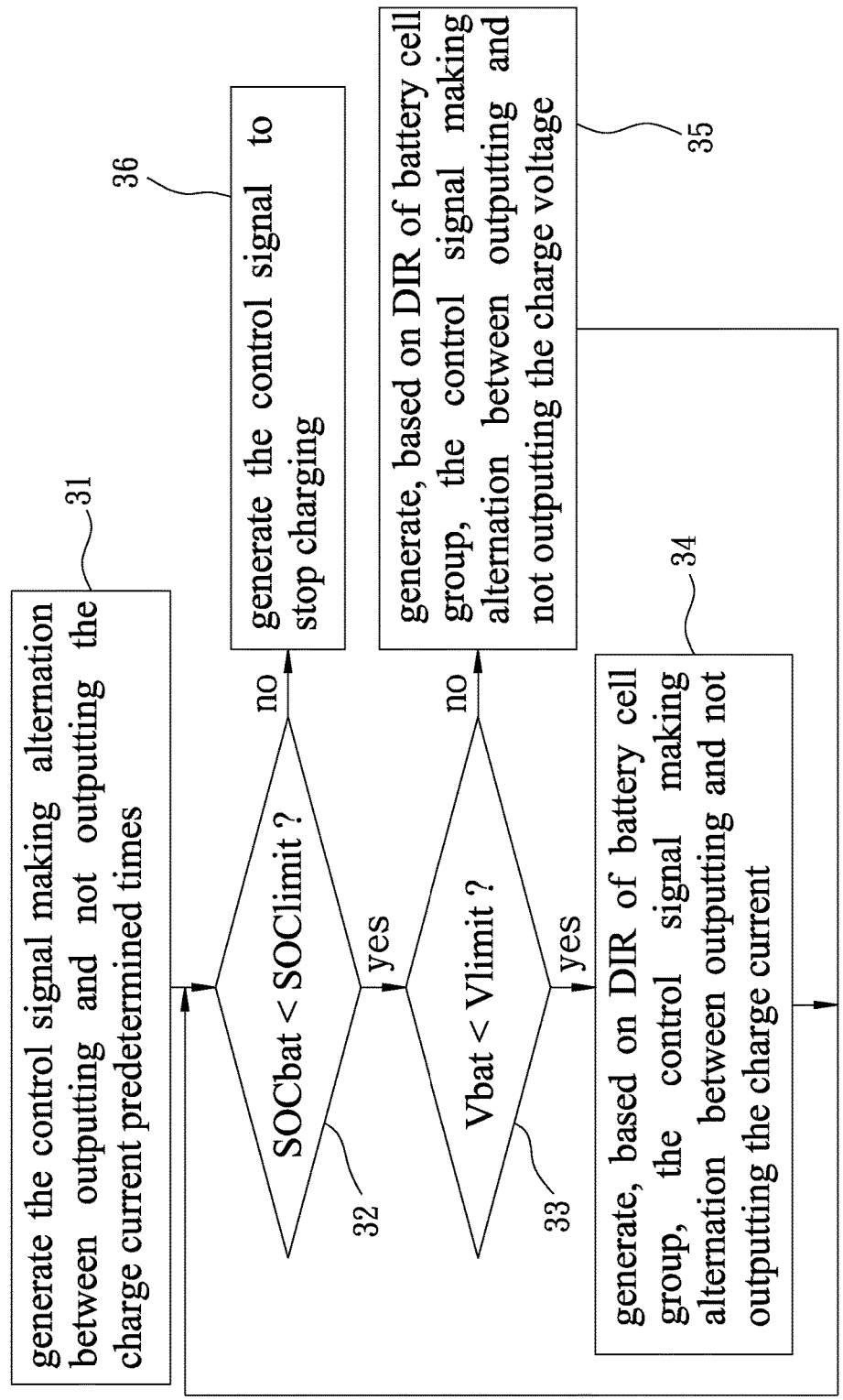
FIG. 2 is a flow chart illustrating a battery charging method performed by the embodiment of the battery charging apparatus.

Referring to FIGS. 1 and 2, a battery charging method for charging the battery apparatus 2 is performed by the battery charging apparatus 1 of this embodiment, and includes the following steps 31-36.

In step 31, the control module 12 generates the control signal making the charging module 11 alternate between outputting and not outputting a charge current to charge the battery cell group 21 with an output time length and a non-output time length in respect of the charge current remaining constant in this step. In particular, the charge current is outputted a predetermined number (N) of times, and has a magnitude that is greater during an $(n+1)^{th}$ one of the outputs than during an $(n)^{th}$ one of the outputs, where N>1 and 0<n<N. For example, the charge current is outputted four times with the output time length and the non-output time length in respect of the charge current both being twenty seconds, and the magnitude of the charge current corresponds to a charge rate of 0.5C, 0.75C, 1C and 1.25C respectively during the first, second, third and fourth outputs.

As a result, the battery cell group 21 is activated during a pre-charging time period, in which step 31 is performed.

In step 32, the control module 12 determines whether the SOC of the battery cell group 21 (SOCbat) is smaller than a predetermined SOC limit value (SOClimit) (e.g., 100%). If affirmative, the flow proceeds to step 33. Otherwise, the flow goes to step 36.

In step 33, the control module 12 determines whether the voltage of the battery cell group 21 (Vbat) is smaller than a predetermined voltage limit value (Vlimit) (e.g., a rated voltage value of the battery cell group 21). If affirmative, the flow proceeds to step 34. Otherwise, the flow goes to step 35.

In step 34, the control module 12 generates, based on the DIR of the battery cell group 21, the control signal making the charging module 11 alternate between outputting and not outputting the charge current to charge the battery cell group 21, where at least one of the output time length in respect of the charge current, the non-output time length in respect of the charge current and the magnitude of the charge current is associated with the DIR of the battery cell group 21. Then, the flow goes back to step 32.

In this embodiment, the control module 12 compares the DIR of the battery cell group 21 with a predetermined DIR limit value and generates the control signal based on a result of the comparison, and the at least one of the output time length in respect of the charge current, the non-output time length in respect of the charge current and the magnitude of the charge current is associated with the result of the comparison between the DIR of the battery cell group 21 and the predetermined DIR limit value.

When the result of the comparison indicates that the DIR of the battery cell group 21 is smaller than the predetermined DIR limit value, the charging module 11 performs, according to the control signal, at least one of the following: increasing the output time length in respect of the charge current; decreasing the non-output time length in respect of the charge current; and increasing the magnitude of the charge current, so as to increase an average of the current of the battery cell group 21. One example may be that the magnitude of the charge current is increased, and the output time length and the non-output time length in respect of the charge current are unchanged. Another example may be that the non-output time length in respect of the charge current is decreased, and the output time length in respect of the charge current and the magnitude of the charge current are unchanged. One other example may be that the output time length in respect of the charge current is increased by a large amount, the non-output time length in respect of the charge current is increased by a small amount, and the magnitude of the charge current is unchanged.

When the result of the comparison indicates that the DIR of the battery cell group 21 is greater than the predetermined DIR limit value, the charging module 11 performs at least one of the following: decreasing the output time length in respect of the charge current; increasing the non-output time length in respect of the charge current; and decreasing the magnitude of the charge current, so as to decrease the average of the current of the battery cell group 21. For example, one case may be that the magnitude of the charge current is decreased, and the output time length and the non-output time length in respect of the charge current are unchanged. Another example may be that the non-output time length in respect of the charge current is increased, and the output time length in respect of the charge current and the magnitude of the charge current are unchanged. One other example may be that the output time length in respect of the charge current is decreased by a large amount, the non-output time length in respect of the charge current is decreased by a small amount, and the magnitude of the charge current is unchanged.

As a result, the DIR of the battery cell group 21 is stabilized at the predetermined DIR limit value in a current charging time period which is after the pre-charging time period, and during which step 34 is performed with the control module 12 having determined that the SOC of the battery cell group 21 (SOCbat) is smaller than the predetermined SOC limit value (SOClimit) and that the voltage of the battery cell group 21 (Vbat) is smaller than the predetermined voltage limit value (Vlimit).

In step 35, the control module 12 generates, based on the DIR of the battery cell group 21, the control signal making the charging module 11 alternate between outputting and not outputting a charge voltage to charge the battery cell group 21, where at least one of an output time length and a non-output time length in respect of the charge voltage is associated with the DIR of the battery cell group 21. Then, the flow goes back to step 32.

In this embodiment, the control module 12 compares the DIR of the battery cell group 21 with the predetermined DIR limit value and generates the control signal based on a result of the comparison, and the at least one of the output time length and the non-output time length in respect of the charge voltage is associated with the result of the comparison between the DIR of the battery cell group 21 and the predetermined DIR limit value.

When the result of the comparison indicates that the DIR of the battery cell group 21 is smaller than the predetermined DIR limit value, the charging module 11 performs, according to the control signal, at least one of the following: increasing the output time length in respect of the charge voltage; and decreasing the non-output time length in respect of the charge voltage, so as to increase an average of the voltage of the battery cell group 21. For example, one case may be that the non-output time length in respect of the charge voltage is decreased, and the output time length in respect of the charge voltage is unchanged. Alternatively, the non-output time length in respect of the charge voltage may be decreased by a large amount, and the non-output time length in respect of the charge voltage may be decreased by a small amount.

When the result of the comparison indicates that the DIR of the battery cell group 21 is greater than the predetermined DIR limit value, the charging module 11 performs, according to the control signal, at least one of the following: decreasing the output time length in respect of the charge voltage; and increasing the non-output time length in respect of the charge voltage, so as to decrease the average of the voltage of the battery cell group 21. For example, the non-output time length in respect of the charge voltage may be increased, and the output time length in respect of the charge current may be unchanged. Alternatively, the non-output time length in respect of the charge current may be increased by a large amount, and the non-output time length in respect of the charge current may be increased by a small amount.

As a result, the DIR of the battery cell group 21 is stabilized at the predetermined DIR limit value in a voltage charging time period which is after the pre-charging time period, and during which step 35 is performed with the control module 12 having determined that the SOC of the battery cell group 21 (SOCbat) is smaller than the predetermined SOC limit value (SOClimit) and that the voltage of the battery cell group 21 (Vbat) is not smaller than the predetermined voltage limit value (Vlimit).

In step 36, the control module 12 generates the control signal making the charging module 11 stop charging the battery cell group 21.

As a result, overcharging of the battery cell group 21 and a waste of electricity are prevented in a charging completion time period which is after the pre-charging time period, and during which step 36 is performed with the control module 12 having determined that the SOC of the battery cell group 21 (SOCbat) is not smaller than the predetermined SOC limit value (SOClimit).

Figure 3:
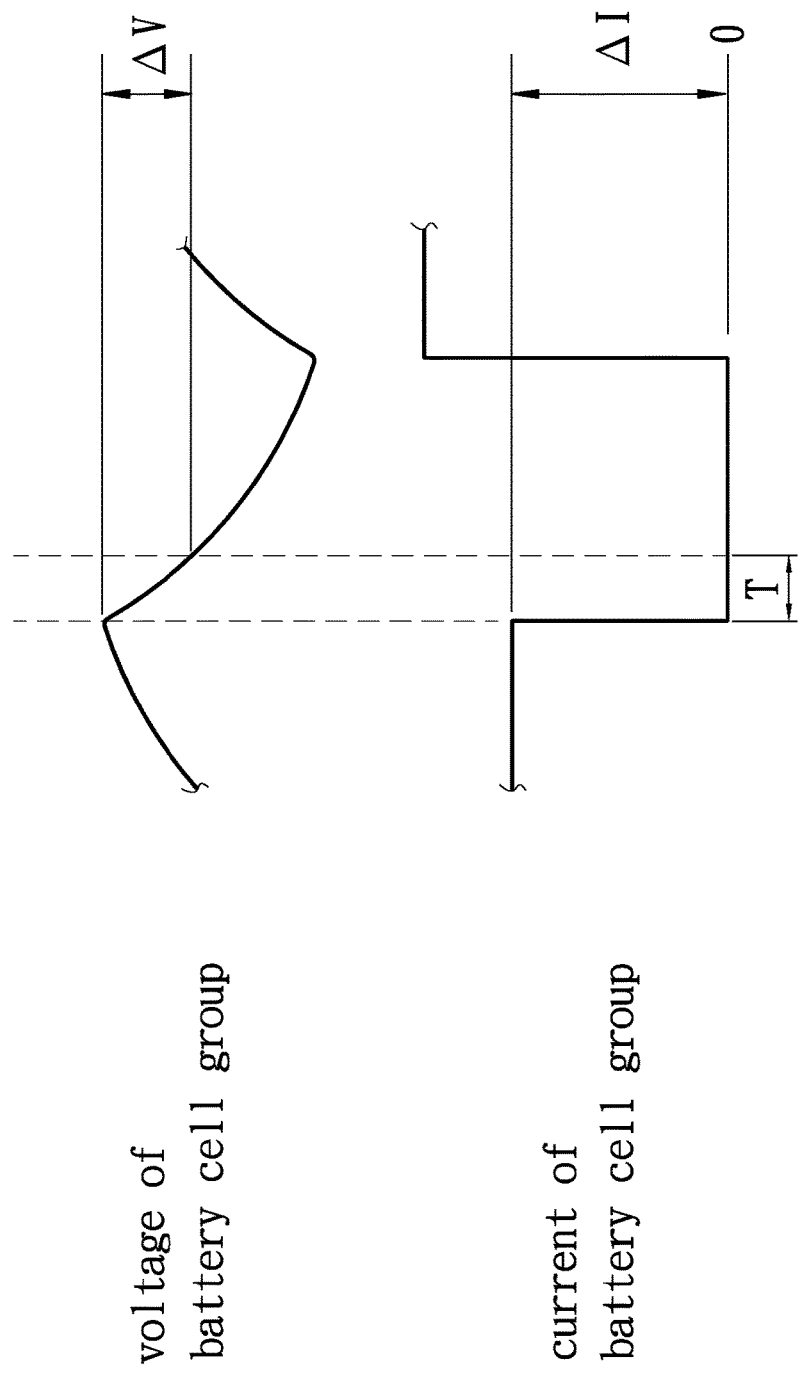
FIG. 3 is an exemplary timing diagram illustrating variation in a voltage and a current of a battery cell group of the battery apparatus that may occur during each of a pre-charging time period and a current charging time period.
Figure 4:
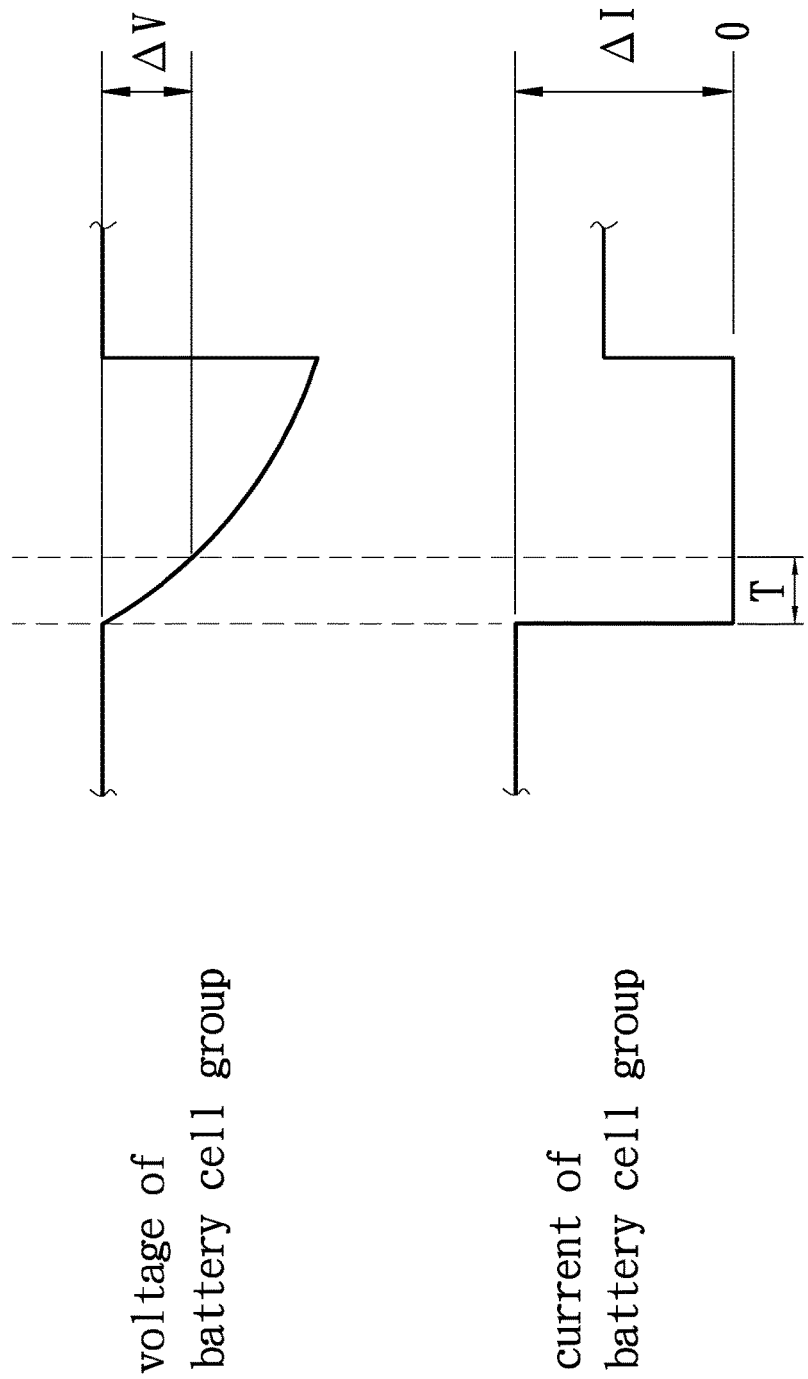
FIG. 4 is an exemplary timing diagram illustrating variation in the voltage and the current of the battery cell group of the battery apparatus that may occur during a voltage charging time period.

FIG. 3 illustrates variation in the voltage and the current of the battery cell group 21 that may occur during each of the pre-charging time period and the current charging time period. FIG. 4 illustrates variation in the voltage and the current of the battery cell group 21 that may occur during the voltage charging time period. Referring to FIGS. 1, 3 and 4, in this embodiment, the control module 12 is operable to obtain, based on the voltage and the current of the battery cell group 21, a voltage variation of the battery cell group 21 ($\Delta V$) during a predetermined time interval (T) (e.g., one second) starting from each falling edge transition of the current of the battery cell group 21, and a current difference of the battery cell group 21 ($\Delta I$) between zero and the magnitude of the current of the battery cell group 21 immediately prior to each falling edge transition of the same. The control module 12 is operable to further obtain a temperature compensation coefficient based on the temperature of the battery cell group 21 during the predetermined time interval (T), and to obtain the DIR of the battery cell group 21 based on the voltage variation and the current difference of the battery cell group 21 ($\Delta V$, $\Delta I$) and the temperature compensation coefficient. It is noted herein that variations in the temperature of the battery cell group 21 is minimal during the predetermined time interval (T) so that the temperature of the battery cell group 21 sensed at any time point during the predetermined time interval (T) may be used for obtaining the temperature compensation coefficient.

The control module 12 may be configured to map the temperature of the battery cell group 21 to the temperature compensation coefficient according to a predetermined temperature mapping function that describes a relationship between the temperature compensation coefficient and the temperature of the battery cell group 21. Alternatively, the control module 12 may pre-store a predetermined temperature mapping table that describes the relationship between the temperature compensation coefficient and the temperature of the battery cell group 21, and may be configured to map the temperature of the battery cell group 21 to the temperature compensation coefficient with reference to the predetermined temperature mapping table.

The control module 12 may be configured to obtain the DIR of the battery cell group 21 in accordance with the following equation:

$$DIR=(\Delta V/\Delta I)\times K,$$

where "DIR" denotes the DIR of the battery cell group 21, and "K" denotes the temperature compensation coefficient.

It is noted that the control module 12 may use the DIR of the battery cell group 21 in the pre-charging time period to determine initial values respectively of the output time length in respect of the charge current, the non-output time length in respect of the charge current and the magnitude of the charge current within the current charging time period.

In application, the battery charging apparatus 1 of this embodiment and the battery apparatus 2 may be both installed in an electrically powered device. Alternatively, the battery charging apparatus 1 of this embodiment may be external to an electrically powered device, and the battery apparatus 2 may be removably or fixedly installed in the electrically powered device.

In view of the above, since the charging module 11 of the battery charging apparatus 1 of this embodiment alternates between outputting and not outputting the charge current/ voltage with reference to the DIR of the battery cell group 21, the DIR and a temperature increase of the battery cell group 21 can be relatively small, resulting in relatively slow degradation and a relatively long lifetime of the battery cell group 21.

While this disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A battery charging apparatus configured to charge a battery apparatus that includes a battery cell group and a battery management system, the battery management system being coupled to the battery cell group, measuring a voltage and a current of the battery cell group, and generating a sense signal that indicates the voltage and the current of the battery cell group, said battery charging apparatus comprising:
- a charging module used to be coupled to the battery cell group; and
- a control module coupled to said charging module, used to be coupled to the battery management system for receiving the sense signal therefrom, and configured to obtain a DIR (dynamic internal resistance) of the battery cell group based at least on the voltage and the current of the battery cell group as indicated by the sense signal, to generate a control signal based at least on the voltage of the battery cell group as indicated by the sense signal and the DIR of the battery cell group, and to output the control signal to said charging module such that said charging module operates based on the control signal;
- wherein, during a current charging time period where said control module determines that the voltage of the battery cell group is smaller than a predetermined voltage limit value, said control module generates, based on the DIR of the battery cell group, the control signal making said charging module alternate between outputting and not outputting a charge current to charge the battery cell group, and at least one of an output time length in respect of the charge current, a non-output time length in respect of the charge current and a magnitude of the charge current is associated with the DIR of the battery cell group; and
- wherein, during a voltage charging time period where said control module determines that the voltage of the battery cell group is not smaller than the predetermined voltage limit value, said control module generates, based on the DIR of the battery cell group, the control signal making said charging module alternate between outputting and not outputting a charge voltage to charge the battery cell group, and at least one of an output time length in respect of the charge voltage and a non-output time length in respect of the charge voltage is associated with the DIR of the battery cell group.

2. The battery charging apparatus of claim 1, wherein, during the current charging time period, said control module compares the DIR of the battery cell group with a predetermined DIR limit value, and generates the control signal based on a result of the comparison, and the at least one of the output time length in respect of the charge current, the non-output time length in respect of the charge current and the magnitude of the charge current is associated with the result of the comparison.

3. The battery charging apparatus of claim 2, wherein, during the current charging time period,
when the result of the comparison indicates that the DIR of the battery cell group is smaller than the predetermined DIR limit value, said charging module performs at least one of increasing the output time length in respect of the charge current, decreasing the non-output time length in respect of the charge current, and increasing the magnitude of the charge current, and
when the result of the comparison indicates that the DIR of the battery cell group is greater than the predetermined DIR limit value, said charging module performs at least one of decreasing the output time length in respect of the charge current, increasing the non-output time length in respect of the charge current, and decreasing the magnitude of the charge current.

4. The battery charging apparatus of claim 1, wherein, during the voltage charging time period, said control module compares the DIR of the battery cell group with a predetermined DIR limit value, and generates the control signal based on a result of the comparison, and the at least one of the output time length in respect the charge voltage and the non-output time length in respect of the charge voltage is associated with the result of the comparison.

5. The battery charging apparatus of claim 4, wherein, during the voltage charging time period,
when the result of the comparison indicates that the DIR of the battery cell group is smaller than the predetermined DIR limit value, said charging module performs at least one of increasing the output time length in respect of the charge voltage, and decreasing the non-output time length in respect of the charge voltage; and
when the result of the comparison indicates that the DIR of the battery cell group is greater than the predetermined DIR limit value, said charging module performs at least one of decreasing the output time length in respect of the charge voltage, and increasing the non-output time length in respect of the charge voltage.

6. The battery charging apparatus of claim 1, the battery management system further measuring a temperature of the battery cell group, the sense signal further indicating the temperature of the battery cell group,
wherein said control module is configured to obtain the DIR of the battery cell group based further on the temperature of the battery cell group as indicated by the sense signal.

7. The battery charging apparatus of claim 1, wherein, during a pre-charging time period before the current charging time period and the voltage charging time period, said control module generates the control signal making said charging module alternate between outputting and not outputting the charge current to charge the battery cell group, where the charge current is outputted a predetermined number (N) of times, and the magnitude of the charge current is greater during an (n+1)th one of the outputs than during an (n)th one of the outputs, where N>1 and 0<n<N.

8. The battery charging apparatus of claim 1, the battery management system further measuring an SOC (state of charge) of the battery cell group, the sense signal further indicating the SOC of the battery cell group, wherein:
said control module is configured to generate the control signal based further on the SOC of the battery cell group as indicated by the sense signal;
during the current charging time period and the voltage charging time period, said control module further determines that the SOC of the battery cell group is smaller than a predetermined SOC limit value; and
during a charging completion time period where said control module determines that the SOC of the battery cell group is not smaller than the predetermined SOC limit value, said control module generates the control signal making said charging module stop charging the battery cell group.

* * * * *